J. G. SPIER.
Method of Aging Liquors.
No. 161,642.
Patented April 6, 1875.
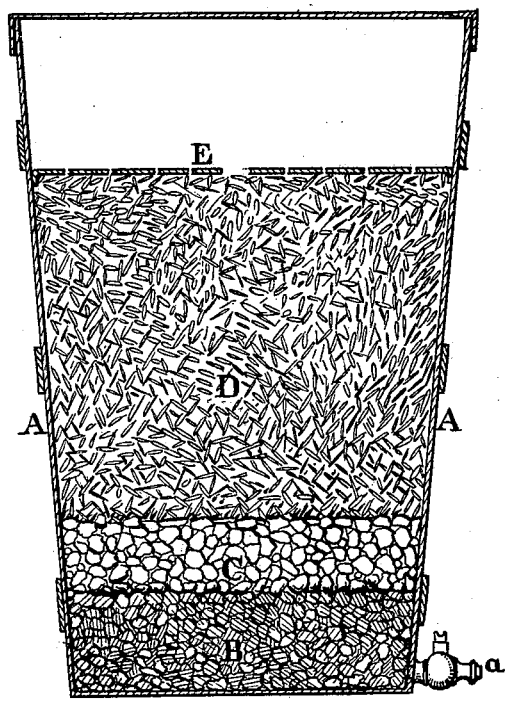
Witnesses
Inventor
James G. Spier

UNITED STATES PATENT OFFICE.

JAMES G. SPIER, OF PEORIA, ILLINOIS.

IMPROVEMENT IN METHODS OF AGING LIQUORS.

Specification forming part of Letters Patent No. 161,642, dated April 6, 1875; application filed December 30, 1874.

*To all whom it may concern:*

Be it known that I, JAMES G. SPIER, of the city of Peoria, in the county of Peoria and in the State of Illinois, have invented an Improvement in the Mode of Coloring, Flavoring, and Producing the Effect of Age Upon Spirituous Liquors; and I do hereby declare that the following is a full, clear, and exact description thereof, reference being had to the annexed drawings, making a part of this specification, in which like letters of reference refer to like parts, and in which—

Figure 1 represents the filter or percolator used in the process herein described, in vertical section.

This mode or process of coloring, flavoring, and aging spirituous liquors is accomplished in two different ways, the same in principle, and is an improvement upon the old mode of allowing the liquors to "age" in a barrel or vessel charred in the interior, which mode consumes a long period of time—as, several years—whereas my process arrives at the desired result in a few days.

The two processes I employ are as follows, viz: First, by percolating the spirits through baked-wood chips or shavings to absorb the tannic acid. Preferably, the wood of the white-oak is used. These are baked, in an oven or other closed heater, to a heat of from 195° to 210° Fahrenheit, until the wood and its tannic principles are thoroughly cooked, but not heated beyond the point destructive of the tannin—a point far short of a charred state of the wood—unavoidable in firing the interior of a barrel for a similar purpose, the aging of whiskey, &c. When the wood is thus prepared—a quantity thereof varying from three to four pounds to one barrel of spirits, according to the quality of the wood—it is brought into contact with the spirits either by percolation or by steeping, as hereinafter described.

To bring about rapid results, the chips or shavings are ground to powder or small particles before being used. When a filtering-vessel is used it is prepared substantially as follows: Place in the filter A, first, a stratum of coarse gravel or similar substance to form a pervious layer, B, from three to four inches in thickness. Upon this pour paper-pulp, reduced to the consistency of thin starch, to form an attenuated fibrous screen, the water of which can be slowly drained off through a faucet, *a*, below, (see drawing,) so as not to break the pulp-screen thus formed. Upon this fibrous screen place another stratum of gravel, C, or similar substance, to protect said screen, and upon this throw a stratum of baked chips or shavings, D—in quantity about three to four pounds to a barrel of spirits—and then place upon the chips or shavings another stratum of gravel, or a screen or perforated disk, E, sufficient to hold down the wood during the influx of the spirits, which can now be introduced, to percolate through these layers. The slower the percolation the better will be the effect upon the same. Of course this process may be varied by altering the stratums, an dsubstituting other auxiliary agents in place of gravel or paper pulp, preserving, however, the baked chips, and the result of the same. Second, by the steeping process, in which the prepared chips or shavings are either thrown loose into the barrel or other vessel containing the spirits to be treated, or placed within a sack, bag, sieve, or other strainer, and hung in the barrel or vessel below the surface of the spirits, the quantity of the chips being in the proportions above recited, and the longer the steeping process is continued the better will be result in extracting from the wood the tannic principle, thereby rapidly ripening the spirits.

What I claim as my invention is—

1. The process of aging spirituous liquors, consisting in treating them with baked wood in chips or in shavings, or ground, to impart the tannic principle thereto, substantially as described.

2. The combination of the stratum of gravel and pulp, gravel, shavings, dust, or chips of baked white-oak or other wood, for a percolator or filter in aging spirits, as described.

In testimony that I claim the foregoing improvement in treating or aging spirits, I have hereunto set my hand this 18th day of December, 1874.

JAMES G. SPIER.

Witnesses:
G. H. KETTELLE,
JNO. M. NIEHAUS.